(12) United States Patent
Kemble et al.

(10) Patent No.: US 7,117,442 B1
(45) Date of Patent: Oct. 3, 2006

(54) EFFICIENT PRESENTATION OF DATABASE QUERY RESULTS THROUGH AUDIO USER INTERFACES

(75) Inventors: Kimberlee A. Kemble, Boca Raton, FL (US); James R. Lewis, Delray Beach, FL (US); Vanessa V. Michelini, Coconut Creek, FL (US); Margarita Zabolotskaya, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 09/775,285

(22) Filed: Feb. 1, 2001

(51) Int. Cl.
*G06F 3/00* (2006.01)

(52) U.S. Cl. .................................... 715/727
(58) Field of Classification Search ................ 345/865, 345/700, 727–729; 704/200, 246–250; 715/727, 715/728, 729
See application file for complete search history.

(56) References Cited

U.S. PATENT DOCUMENTS

| | | | |
|---|---|---|---|
| 5,121,470 A * | 6/1992 | Trautman | 345/440 |
| 5,287,102 A * | 2/1994 | McKiel, Jr. | 340/825.19 |
| 5,754,736 A | 5/1998 | Aust | |
| 6,088,671 A * | 7/2000 | Gould et al. | 704/235 |
| 6,100,891 A * | 8/2000 | Thorne | 715/854 |
| 6,240,448 B1* | 5/2001 | Imielinski et al. | 709/218 |
| 6,492,999 B1* | 12/2002 | Fado et al. | 345/727 |
| 6,539,080 B1* | 3/2003 | Bruce et al. | 379/88.17 |
| 6,920,425 B1* | 7/2005 | Will et al. | 704/275 |
| 6,941,273 B1* | 9/2005 | Loghmani et al. | 705/26 |

FOREIGN PATENT DOCUMENTS

| | | |
|---|---|---|
| JP | 06-110835 | 4/1994 |
| JP | 07-078183 | 3/1995 |
| JP | 08-263252 | 10/1996 |
| JP | 09-325789 | 12/1997 |
| JP | 10-063296 | 3/1998 |
| JP | 2001-013978 | 1/2001 |

OTHER PUBLICATIONS

Makishima, K., "Low Cost CTI Software for Acquiring Information Over a Phone", Hello! PC, vol. 5, No. 11, (Jun. 24, 1998).

* cited by examiner

*Primary Examiner*—Kristine Kincaid
*Assistant Examiner*—Thanh Vu
(74) *Attorney, Agent, or Firm*—Akerman Senterfitt

(57) ABSTRACT

A system for presenting database query results through an AUI can include a database manager for managing a database query operation on at least one database. The database query operation can produce database query result items. The system further can include a dialog manager for managing the presentation of the database query result items through the AUI concurrently with the database query operation. Notably, the AUI can include a text-to-speech processor for converting the database query result items into audible speech; and, a speech recognition engine for converting speech input into text recognizable by the dialog manager. The AUI further can include a barge-in facility. In one aspect of the invention, the system also can include a queue for storing database query result items from the database query operation; and, a queue manager for managing the insertion and removal of database query items to and from the queue.

18 Claims, 4 Drawing Sheets

EFFICIENT PRESENTATION OF DATABASE QUERY RESULTS THROUGH AUDIO USER INTERFACES

BACKGROUND OF THE INVENTION

1. Technical Field

This invention relates to the field of speech recognition and more particularly to presenting database query results in an audio user interface.

2. Description of the Related Art

Designing effective methods of presenting information to users can be challenging for application developers. In a non-visual medium, such as telephony, this problem can be complicated even further. Specifically, in an audio user interface ("AUI"), visual feedback is not available to cue users or to confirm the accurate contextual understanding of user speech input. Additionally, listening to and comprehending spoken information typically consumes more time and can be less comfortable to users when compared to the visual comprehension of the same information. The problems associated with an AUI can become exacerbated when text-to-speech technology is used to present information. Moreover, using voice recognition to control and manipulate the presentation of audible information also can prove problematic.

Presently, conventional AUIs have been configured to process spoken database queries from which query result sets can be audibly played back through the telephony interface. One method illustrated in the flow chart of FIG. 4A that is typically used to present the results of a database query over a telephone involves a series of synchronously performed procedures. These procedures can include querying a database, retrieving query result items from the database, converting the query result items to audible sound samples that can be played back to the user, playing back the audible sound samples to the user, and receiving a user response to the played back results. The query results typically can be presented as follows: "Say 'one' for <result 1>; Say 'two' for <result 2>; . . . Say 'n' for <result n>." Typically, the user regains control over the application only after the database query operation has been completed, the full set of query results have been received, the results have been converted to speech, and the speech converted results have been played back to the user.

While the database query is only one of the steps in the process of obtaining and presenting information to the user, the latency which can result in consequence both of the database query and the speech representation of the result can play an important role in the design of AUIs. FIG. 4B is a time progression block diagram showing the time progression of a conventional database query process. As shown in FIG. 4B, in a conventional telephony interface to database information, query results are not presented to the requesting user until the database search operation has been completed. However, complicated queries involving large databases can cause lengthy delays before the user can receive any response through the telephony interface. These lengthy delays can cause usability problems. Most typically, the user simply hangs up. Moreover, inefficiencies can arise where the requested information is located near the beginning of the query results list, but the user is compelled to wait until the entire query results list has been compiled. In this case, the user has no way to interrupt the query operation prior to completion. Hence, what is needed is a solution to the problems encountered when querying a database through an AUI.

SUMMARY OF THE INVENTION

A method for presenting database query results through an audio user interface (AUI) can include initiating a database query operation. The operation can result in the retrieval of a plurality of database query result items from at least one database. The method further can include presenting each query result item through the AUI as each query result item is found in the at least one database. Notably, the presentation can occur concurrently with the database query operation.

The method further can include detecting a speech response through the AUI during the presentation. The speech response can be the speech selection of a query result item presented through the AUI. The method further can include terminating the database query operation responsive to the detection. Additionally, the method can include detecting a command during the presentation to terminate the database query operation; and, responsive to the detection, terminating the database query operation. Notably, the command can be a speech command.

The method further can include inserting each result item in a data structure as each query result item is found. As such, the presenting step can include presenting each query result item contained in the data structure independently of but concurrently with the database query operation. Notably, the data structure can be a data structure selected from the group consisting of a list, a stack, and a database. Finally, the AUI can be a telephony interface.

A system for presenting database query results through an AUI can include a database manager for managing a database query operation on at least one database. The database query operation can produce database query result items. The system further can include a dialog manager for managing the presentation of the database query result items through the AUI concurrently with the database query operation. Notably, the AUI can include a text-to-speech processor for converting the database query result items into audible speech; and, a speech recognition engine for converting speech input into text recognizable by the dialog manager. The AUI further can include a barge-in facility. In one aspect of the invention, the system also can include a queue for storing database query result items from the database query operation; and, a queue manager for managing the insertion and removal of database query items to and from the queue.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

In accordance with the inventive arrangements, a database query can be performed concurrently with the presentation of query results in an Audio User Interface ("AUI"). More particularly, the database query can be performed on a 'GetFirst/GetNext' basis in which the first matching record is retrieved, followed by successive matching records. Each time a record is found in the database which matches the database query, the record can be presented to the user through the AUI as a query result item. Significantly, each query result item resulting from the database query can be presented through the AUI to the user as each record match occurs. In consequence, the user can terminate the database query operation when the user identifies a suitable matching record.

Figure 1A:
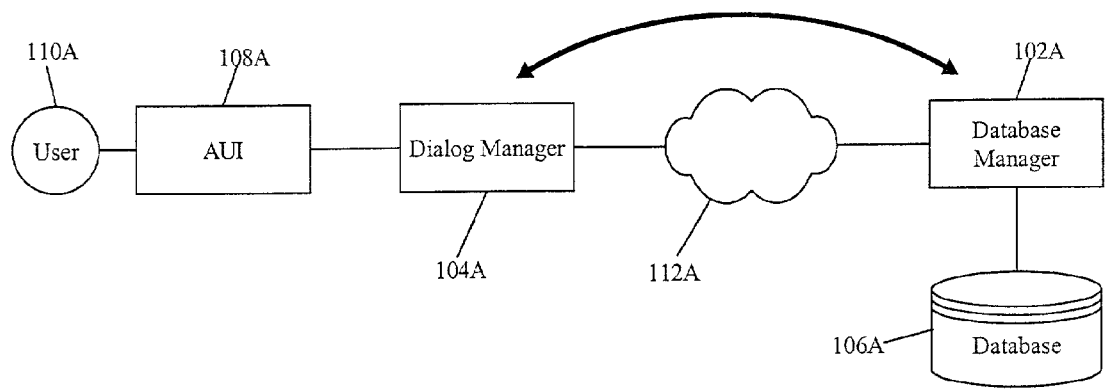
FIG. 1A is a schematic representation of a system for efficient presentation of database query results in an audio user interface.

Notably, in the preferred aspect of the present invention, the total time necessary to complete the database query operation will not exceed the total time necessary to complete a database query operation in a conventional database query system having an AUI through which query results are presented. More particularly, at one extreme, when the desired record is one of the last matching records in the database, the time consumed in performing the query can approach that of the conventional method. In contrast, when the desired record is one of the first records matched in the database, the present invention reduces the total time necessary to complete the database query operation by a factor of two (2) or more. The following formula can be used to estimate the maximum time consumed in an average number of query sessions with a user:

$$tmax = (tprompt + tuser) * nitem$$

where tprompt is the average time of playing back a text-to-speech converted query result item through the AUI, tuser is the time for user response to each played back query result item, and nitem is the average number of records matched as a result of the query. The present invention increases user productivity in comparison with conventional methods when tdb>tmax where tdb is the average time to perform a full query of the database specifying a database query of average complexity. In one aspect of the present invention, a two-component model can be used to form a system for presenting database query results through an AUI. A system for presenting database results through an AUI incorporating a two-component model is shown in the schematic illustration of FIG. 1A. A two-component model based system in accordance with the inventive arrangements can include a Database Manager 102A and a Dialog Manager 104A, each communicatively linked to one another through a computer communications network 112A. The invention is not limited in this regard, however, and the Database Manager 102A and Dialog Manager 104A can communicate through other means for example shared memory.

The Database Manager 102A can perform and manage the database query process. Accordingly, the Database Manager 102A can be communicatively linked to at least one database 106A. By comparison, the Dialog Manager 104A can be communicatively linked to an AUI 108A through which database result items can be audibly presented to a user 110A. Notably, the user 110A can interact with the AUI 108A through an audio input/output device (not shown) such as a telephone handset, microphone/speaker combination, etc. Importantly, the Dialog Manager 104A can synchronize the operation of the Dialog Manager 104A with the operation of the Database Manager 102A.

In operation, the user 110A can audibly request a database query through the AUI 108A. For example, the user 110A can request a telephone directory for all departments of a store. The AUI 108 can speech-to-text convert the audible request and transmit the same to the Dialog Manager 104A. The Dialog Manager 104A can receive the request from the AUI 108A and can formulate a proper database query recognizable by the Database Manager 102A. In this example, the database query can request all departmental telephone entries for the specified store.

The Dialog Manager 104A can forward the database query to the Database Manager 102A which can apply the query to the database 106A. When the Database Manager 102A receives a query match resulting from the database query, the Database Manager 102A can forward the corresponding query result item to the Dialog Manager 104A. Thus, in the present example, when a departmental telephone entry is retrieved from the database, the departmental telephone entry can be forwarded to the Dialog Manager 104A. The Dialog Manager 104A, in turn, can transmit the query result item to the AUI 108A which can text-to-speech convert the query result item into an audible form suitable for presentation to the user 110A. In this case, the AUI can audibly present the retrieved departmental telephone entry.

If the user 110A determines that the presented query result is the desired query result, the user 110A can request termination of the database query, responsive to which the Dialog Manager 104A can notify the Database Manager 102A to terminate the database query. Thus, in the present example, if the retrieved departmental telephone entry is the desired telephone entry, the user 110A can select the entry causing the query to terminate. By comparison, if the user 110A determines that the presented query result is not the desired query result, the user 110A can request the continuation fo the database query, responsive to which the Dialog Manager 104A can notify the Database Manager 102A to continue the database query. Consequently, the Database Manager 102A can forward the next query match to the Dialog Manager 104A. In the present example, another departmental telephone entry can be audibly presented to the user 110A. Notably, this process can repeat until all query matches have been received in the Dialog Manager 104A, or the user requests termination of the database query.

Figure 2A:
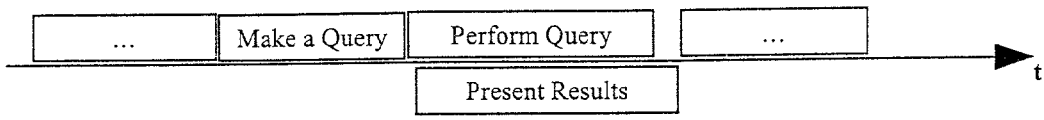
FIG. 2A is a time progression block diagram for the system of FIG. 1A.
Figure 2B:
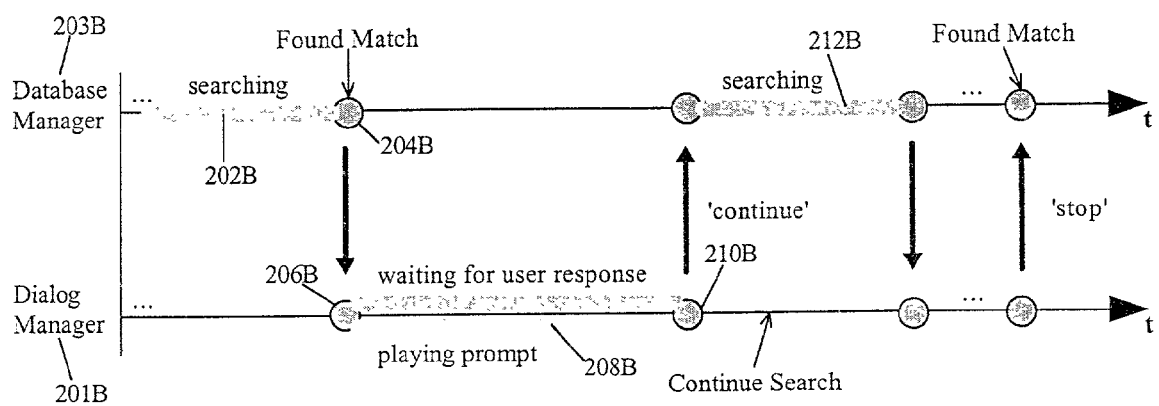
FIG. 2B is a time progression event diagram for the system of FIG. 1A.
Figure 4A:
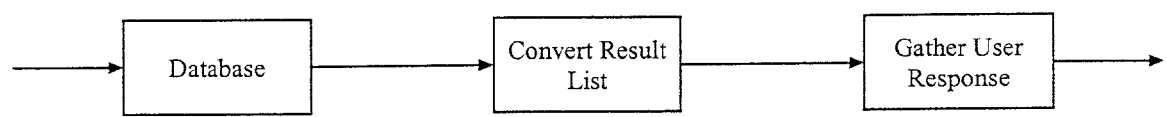
FIG. 4A is a flow chart illustrating a conventional process for representing database query results in an audio user interface.
Figure 4B:
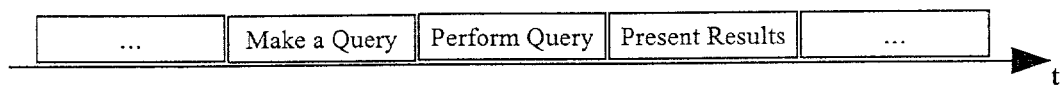
FIG. 4B is a time progression block diagram for a convention system for representing database query results in an audio user interface.

FIG. 2A is a time progression block diagram illustrating the operation of the two-component configuration. As shown in FIG. 2A, and in contrast to the conventional query process of FIG. 4B, the presentation of query results through the AUI 108A in the present invention can occur concurrently with the performance of the database query. Specifically, the user can formulate a database query and, subsequently, incremental query results can be presented to the user concurrently with the performance of the database query. FIG. 2B is a time progression event diagram which further illustrates the concurrence of operation between a Dialog Manager 201B and the Database Manager 203B. As shown in FIG. 2B, the Database Manager 203B can initiate a GetFirst/GetNext database query. During time period 202B, the Database Manager 203B can search for the first record in the database which matches the database query. At junction 204B, the Database Manager 203B can find the first matching record and can report the query result item to the Dialog Manager 201B at junction 206B. Upon receiving the query result item, during time period 208B the Dialog Manager 201B can cause the AUI to audibly play back the query result item to the user.

During the playback of the query result item, the Dialog Manager 201B can permit user "barge-in" in which the user can interrupt the playback of the query result item with a voice command. Thus, during time period 208B, the user can permit the playback to continue to completion and permit the database query operation to continue, permit the playback to continue to completion and subsequently terminate the search, or barge-in and terminate the search. Notably, where no barge-in facility is provided, the "waiting for user response" function can occur subsequent to the "playing prompt" function. At junction 210B, the database query can terminate or continue. If the database query is to continue, during time period 212B the Database Manager 203B can continue to search the database for the next matching record. This process can continue until there are no more matching records in the database, or until the user terminates the database query.

For databases where performing the database query does not cause a significant delay, the two-component configuration does not detract from the efficiency of presenting a query result set in an AUI. Additionally, the two-component configuration has the advantage that users can control the query process and can terminate the query operation. In other words, the Database Manager 102A of FIG. 1A will not continue the query process when the desired query result item has been selected by the user 110A before the database query process has completed. The query result item can be presented to the user 110A immediately, or the query result item can be delayed while a prompt is played and a response received. If the query result item is presented immediately (when the database query finds a match), short pauses can be introduced into audible presentation through the AUI 108A to provide a minimum of separation between audio prompts. In either case, the database query process can continue while the query result item is presented through the AUI 108A.

The database query and presentation process of the two-component configuration can be improved by eliminating any delays in the database query while the Dialog Manager interacts with the user in a speech recognition session. In this case, presenting the query result can take longer than the database query because each session with the user (playing a prompt and processing a user response) is performed simultaneously with subsequent database queries. This condition requires a mechanism which accumulates the search results and synchronizes access to them. In this solution, a shared queue (managed by a Queue Manager component) is used to synchronize the two operations (the database query and the presentation of the query results).

Figure 1B:
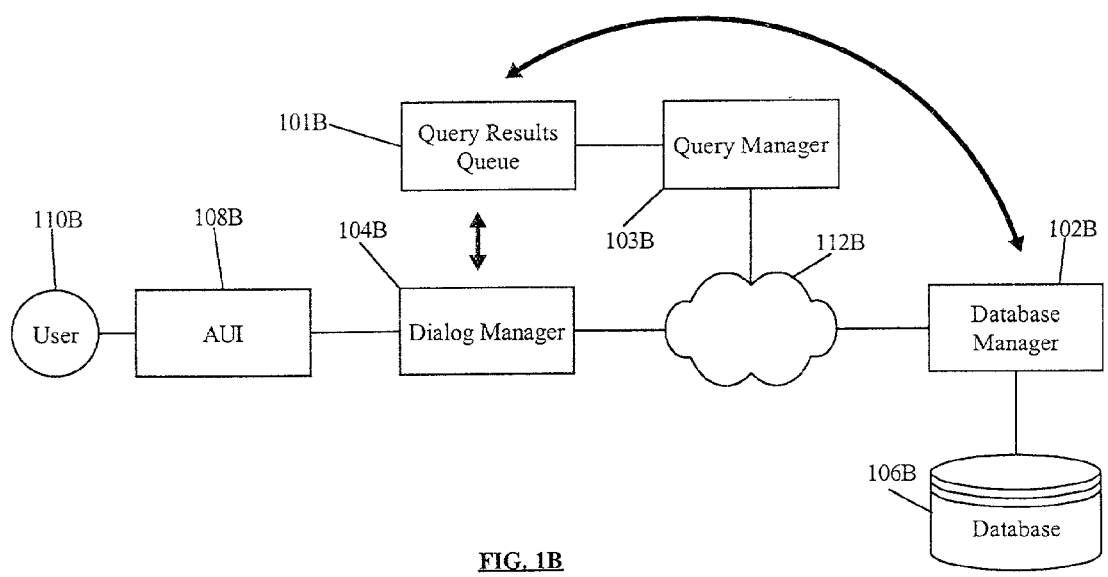
FIG. 1B is a schematic representation of the system of FIG. 1A incorporating a query manager.

FIG. 1B illustrates an exemplary three-component configuration in which a Query Manager 103B is included along with the Database Manager 102B and Dialog Manager 104B. In contrast to the two-component configuration illustrated in FIG. 1A, in the three-component configuration of FIG. 1B, each query result item from the database query is passed to the Queue Manager 103B. The Queue Manager 103B synchronizes the delivery of the queue results to the Dialog Manager 104B, storing data in Query Results Queue 101B until the database query has completed or the database query has been interrupted by the Dialog Manager 104B, i.e., the user 110B has selected a query result item or has cancelled the database query.

Figure 3:
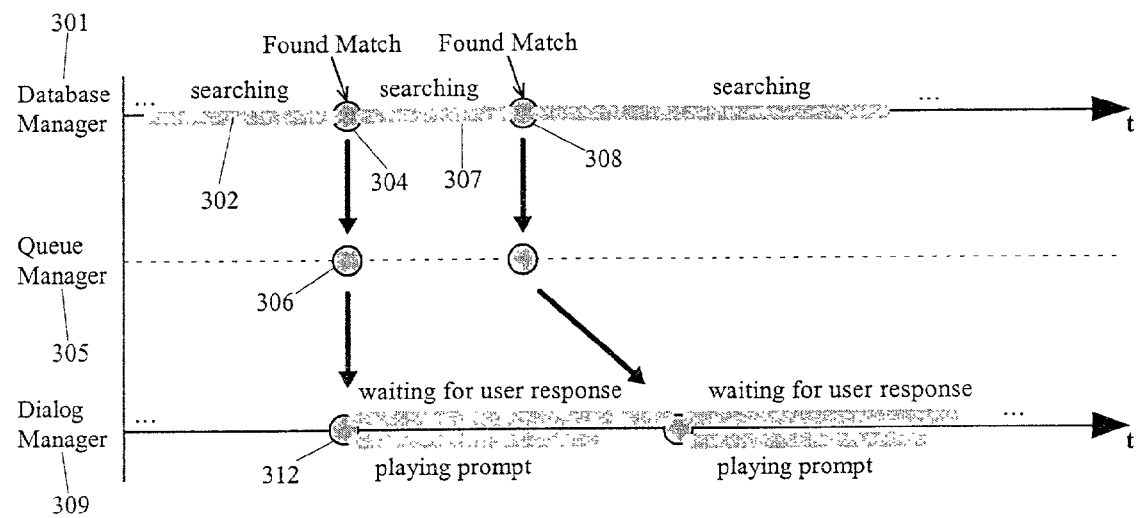
FIG. 3 is a time progression event diagram for the system of FIG. 1B.

FIG. 3 is a time progression event diagram illustrating the operation of the three-component configuration. As shown in FIG. 3, the Database Manager 301 can initiate a GetFirst/GetNext database query. During time period 302, the Database Manager 301 can search for the first record in the database which matches the database query. At junction 304, the Database Manager 301 can find the first matching record and can insert the query result item into a queue through the Queue Manager 305 at junction 306. Importantly, the Database Manager 301 can continue to search for the next matching record during time period 307. When the Database Manager 301 finds a next matching record, for example at junction 308, another query result item can be inserted into the queue at junction 310 through Query Manager 305. This process can continue until there are no more matching records in the database or until the user terminates the query operation.

Concurrently, the Dialog Manager 309 can wait until a query result item is inserted into the queue. Subsequently, at junction 312 a query result item can be removed from the queue through the Queue Manager 305 and audibly presented to the user. As before, where a barge-in facility is available, the user can interrupt the playback of the query result item. If the user does not terminate the query operation, the Dialog Manager 309 can retrieve the next available query result item from the queue. This process can continue until no items remain in the queue because no more matching records exist in the database, or until the user terminates the database query operation.

Notably, supporting a shared resource between the two components does not require valuable CPU time to synchronize. In particular, CPU time is not required because no search is performed over the queue by any component. Moreover, the Database Manager is the only component configured to add a query result element to the queue (at the beginning). Finally, the Dialog Manager is the only component configured to remove a query result element from the queue (at the end). Some additional amount of synchronization time may be needed when the queue has no elements or only has one element, and both the Database Manager and Dialog Manager attempt to access the queue. As soon as the Queue Manager performs all synchronization tasks, all operations with the queue are transparent to the components and do not require any additional analysis.

The present invention has several advantages over the prior art. First, less total time is spent on performing the query and representing the data. Second, the user is able to control the query process and interrupt it if needed. Third, the process is "ergonomically comfortable"—during a long search, the user gets explicit notification that the system is performing the task by receiving a prompt after each matching item. Furthermore, the information is presented to the user as individual items, rather than many items in a potentially long list (which can be difficult to comprehend).

Notably, the present invention can be realized in hardware, software, or a combination of hardware and software. The method of the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which when loaded in a computer system is able to carry out these methods. Computer program means or computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

We claim:

1. A method for presenting database query results through an audio user interface (AUI), comprising:
   initiating a database query operation, said operation retrieving a plurality of database query result items from at least one database; and,
   audibly presenting one-by-one the retrieved database query result items through the AUI as each said query result item is found in said at least one database, said presenting step occurring concurrently with said database query operation and continuing until a particular one of the retrieved database query result items is selected by a user, or until each of the retrieved database query result items has been sequentially presented to the user;
   wherein the concurrently performed database query operation and audible presentment of retrieved database query result items terminate when the user supplies through the AUI a speech input indicating a user selection of a particular one of the retrieved database query result items.

2. The method of claim 1, further comprising:
   detecting a command during said presentation to terminate said database query operation; and,
   responsive to said detection, terminating said database query operation.

3. The method of claim 2, wherein said command is a speech command.

4. The method of claim 1, further comprising:
   inserting each result item in a data structure as each query result item is found.

5. The method of claim 4, wherein said presenting step comprises:
   presenting each query result item contained in said data structure independently of but concurrently with said database query operation.

6. The method of claim 1, wherein said data structure is selected from the group consisting of a list, a stack, and a database.

7. The method of claim 1, wherein said AUI is a telephony interface.

8. A system for presenting database query results through an audio user interface (AUI) comprising:
   a database manager for managing a database query operation on at least one database, said database query operation producing database query result items; and,
   a dialog manager for managing the presentation of said database query result items through the AUI concurrently with said database query operation;
   wherein said database manager and said dialog manager are configured to concurrently perform the database query operation and audible presentments of database query result items such that the each query result item is presented sequentially as each is identified through the database query operation, the sequential presentment continuing until a particular one of the retrieved database query result items is selected by a user, or until each of the retrieved database query result items has been sequentially presented to the user; and
   wherein said database manager and said dialog manager are further configured to terminate the concurrently performed database query operation and audible presentment of retrieved database query result items when the user supplies through the AUI a speech input indicating a user selection of a particular one of the retrieved database query result items.

9. The system of claim 8, wherein said AUI comprises:
   a text-to-speech processor for converting said database query result items into audible speech; and,
   a speech recognition engine for converting speech input into text recognizable by said dialog manager.

10. The system of claim 9, wherein said AUI further comprises:
    a barge-in facility.

11. The system of claim 8, further comprising:
    a queue for storing database query result items from said database query operation; and,
    a queue manager for managing the insertion and removal of database query items to and from said queue.

12. A machine readable storage having stored thereon a computer program for presenting database query results through an AUI, said computer program having a plurality of code sections executable by a machine for causing the machine to perform the steps of:
    initiating a database query operation, said operation retrieving a plurality of database query result items from at least one database; and,
    audibly presenting one-by-one the retrieved database query result items through the AUI as each said query result item is found in said at least one database, said presenting step occurring concurrently with said database query operation and continuing until a particular one of the retrieved database query result items is selected by a user, or until each of the retrieved database query result items has been sequentially presented to the user;
    wherein the concurrently performed database query operation and audible presentment of retrieved database query result items terminate when the user supplies through the AUI a speech input indicating a user selection of particular one of the retrieved database query result items.

13. The machine readable storage of claim 12, further comprising:
    detecting a command during said presentation to terminate said database query operation; and,
    responsive to said detection, terminating said database query operation.

14. The machine readable storage of claim 13, wherein said command is a speech command.

15. The machine readable storage of claim 12, further comprising:
    inserting each result item in a data structure as each query result item is found.

16. The machine readable storage of claim 15, wherein said presenting step comprises:
    presenting each query result item contained in said data structure independently of but concurrently with said database query operation.

17. The machine readable storage of claim 12, wherein said data structure is selected from the group consisting of a list, a stack, and a database.

18. The machine readable storage of claim 12, wherein said AUI is a telephony interface.

* * * * *